United States Patent
Gaddam et al.

(10) Patent No.: US 12,361,281 B2
(45) Date of Patent: Jul. 15, 2025

(54) PROACTIVE DEFENSE OF UNTRUSTWORTHY MACHINE LEARNING SYSTEM

(71) Applicant: Visa International Service Association, San Francisco, CA (US)

(72) Inventors: Ajit Gaddam, Foster City, CA (US); Ara Jermakyan, Northridge, CA (US); Pushkar Joglekar, Emeryville, CA (US)

(73) Assignee: Visa International Service Association, San Francisco, CA (US)

( * ) Notice: Subject to any disclaimer, the term of this patent is extended or adjusted under 35 U.S.C. 154(b) by 1090 days.

(21) Appl. No.: 17/267,916

(22) PCT Filed: Aug. 23, 2018

(86) PCT No.: PCT/US2018/047793
§ 371 (c)(1),
(2) Date: Feb. 11, 2021

(87) PCT Pub. No.: WO2020/040776
PCT Pub. Date: Feb. 27, 2020

(65) Prior Publication Data
US 2021/0319099 A1 Oct. 14, 2021

(51) Int. Cl.
*G06N 3/08* (2023.01)
*G06F 21/55* (2013.01)
*G06N 20/10* (2019.01)

(52) U.S. Cl.
CPC ............ *G06N 3/08* (2013.01); *G06F 21/554* (2013.01); *G06N 20/10* (2019.01); *G06F 2221/2133* (2013.01)

(58) Field of Classification Search
CPC .......... G06N 3/063; G06N 3/08; G06N 3/044; G11C 11/40; G11C 11/54
See application file for complete search history.

(56) References Cited

U.S. PATENT DOCUMENTS

| 9,639,699 B1 | 5/2017 | Kurupati |
| 2008/0184371 A1 | 7/2008 | Moskovitch et al. |

(Continued)

FOREIGN PATENT DOCUMENTS

| CN | 107742079 A | 2/2018 |

OTHER PUBLICATIONS

Li, Pan et al. "Chronic Poisoning against Machine Learning Based IDSs Using Edge Pattern Detection." 2018 IEEE International Conference on Communications (ICC). IEEE, 2018. 1-7. (page numbers inserted) (Year: 2018).*

(Continued)

*Primary Examiner* — Daniel T Pellett
(74) *Attorney, Agent, or Firm* — Kilpatrick Townsend & Stockton LLP

(57) ABSTRACT

Methods and systems for inducing model shift in a malicious computer's machine learning model is disclosed. A data processor can determine that a malicious computer uses a machine learning model with a boundary function to determine outcomes. The data processor can then generate transition data intended to shift the boundary function and then provide the transition data to the malicious computer. The data processor can repeat generating and providing the transition data, thereby causing the boundary function to shift over time.

20 Claims, 7 Drawing Sheets

(56) References Cited

U.S. PATENT DOCUMENTS

| | | | |
|---|---|---|---|
| 2011/0320816 | A1 | 12/2011 | Yao et al. |
| 2017/0235954 | A1 | 8/2017 | Kurupati |
| 2020/0019699 | A1* | 1/2020 | Araujo .................. G06N 3/045 |
| 2020/0019821 | A1* | 1/2020 | Baracaldo-Angel .... G06F 18/10 |
| 2020/0050945 | A1* | 2/2020 | Chen ..................... G06F 18/214 |

OTHER PUBLICATIONS

Pan, L., Liu, Q., Zhao, W., Wang, D., & Wang, S. (2018). BEBP: An poisoning method against machine learning based IDSs. Ithaca: Retrieved from https://www.proquest.com/working-papers/bebp-poisoning-method-against-machine-learning/docview/2071758903/se-2 (Year: 2018).*

Geitgey, "Machine Learning is Fun Part 8: How to Intentionally trick Neural Networks" Medium, Available at https://medium.com/@ageitgey/machine-learning-is-fun-part-8-how-to-intentionally-trick-neural-networks-b55da32b7196, Aug. 16, 2017, pp. 1-18. (Year: 2017).*

EP18931228.3 , "Extended European Search Report", Jul. 8, 2021, 12 pages.

Li et al., "Chronic Poisoning Against Machine Learning Based IDSs Using Edge Pattern Detection", IEEE International Conference on Communications ((ICC), IEEE, XP03337831, May 20, 2018, pp. 1-7.

Li et al., "Selecting Critical 1-13 Patterns Based on Local Geometrical and Statistical Information", IEEE Transactions on Pattern Analysis and Machine Intelligence, IEEE Computer Society, vol. 33, No. 6, XP011409082, Jun. 1, 2011, pp. 1189-1201.

CN201880098320.1, "Office Action", Oct. 17, 2023, 22 pages.

Geitgey , "Machine Learning Is Fun Part 8: How to Intentionally Trick Neural Networks", Medium, Available Online at: https://medium.com/@ageitgey/machine-learning-is-fun-part-8-how-to-intentionally-trick-neural-networks-b55da32b7196, Aug. 16, 2017, pp. 1-18.

PCT/US2018/047793 , "International Search Report and Written Opinion", May 21, 2019, 10 pages.

Szegedy et al., "Intriguing Properties of Neural Networks", arXiv:1312.6199v4 [cs.CV], Available Online at: https://arxiv.org/abs/1312.6199, Feb. 19, 2014, pp. 1-10.

SG11202101527U , "Written Opinion", Dec. 5, 2022, 6 pages.

Szegedy et al., "Going Deeper with Convolutions", Institute of Electrical and Electronics Engineers Conference on Computer Vision and Pattern Recognition, Sep. 17, 2014, pp. 1-12.

* cited by examiner

PROACTIVE DEFENSE OF UNTRUSTWORTHY MACHINE LEARNING SYSTEM

This application is a National Stage of International Application No. PCT/US2018/047793 filed Aug. 23, 2018, of which is herein incorporated by in its entirety.

BACKGROUND

As machine learning systems have become more robust, efficient, and accurate, machine learning has been applied to an increasing number of academic, industrial, and security applications. In particular, machine learning classifiers have found increasing use in automating complex processes that require careful decision making.

A machine learning classifier is a type of machine learning model that learns to differentiate between input data belonging to multiple classes. For example, a machine learning classifier can be used to differentiate between real news articles and fake news articles, legitimate emails and spam emails, various images (e.g., between an image of a dog and an image of a cat), or alphanumeric characters. During a training phase, machine learning classifiers can learn to recognize patterns in labeled training data. Later, during production, the machine learning classifier can use these recognized patterns in order to produce classification data corresponding to the input data, for example, classifying a news article (input data) as fake news (classification data).

Malicious entities (e.g., hackers) can use machine learning models, such as machine learning classifiers, to perform malicious attacks. For example, a malicious entity can use a machine learning classifier to classify images or alphanumeric characters in order to bypass CAPTCHA (completely automated public Turing test to tell computers and humans apart) systems. In a CAPTCHA system, a user can be required to select images corresponding to a theme (e.g., images of dogs) or correctly type a string of alphanumeric characters based on characters displayed on a screen in order to gain access to a system. The malicious machine learning classifier can be used to classify images, such as images of dogs, such that the malicious machine learning classifier can perform the CAPTCHA and gain access to the system.

Currently malicious computers can be blacklisted, after its malicious actions have been discovered, such that the malicious computer can no longer attempt the CAPTCHA. However, malicious computers can simply use a VPN, or the like, to use a new IP address, thus circumventing the blacklist.

Embodiments of the invention address this problem and other problems individually and collectively.

SUMMARY

Embodiments of the invention are directed to methods and systems for inducing model shifts in machine learning models of malicious entities over time. Model shift may refer to a process where a machine learning model changes over time as a result of new training data being included in the training data set. As an example, model shift in a machine learning classifier may manifest as a change in the classifications produced by the machine learning classifier, such as an image classifier classifying an image as a dog, but classifying the same image as a cat at a later date. A data processor can generate transition data intended to induce model shift in a malicious machine learning model. The model shift can inhibit the malicious computer from performing malicious attacks using the malicious machine learning model.

One embodiment is directed to a method comprising: a) determining, by a data processor, that a malicious computer uses a machine learning model with a boundary function to determine outcomes; b) generating, by the data processor, transition data intended to shift the boundary function; c) providing, by the data processor to the malicious computer, the transition data, and d) repeating, by the data processor, steps b) and c), thereby causing the boundary function to shift over time.

Another embodiment is directed to a data processor comprising: a processor; a memory device; and a computer-readable medium coupled to the processor, the computer-readable medium comprising code executable by the processor for implementing a method comprising: a) determining that a malicious computer uses a machine learning model with a boundary function to determine outcomes; b) generating transition data intended to shift the boundary function; c) providing, to the malicious computer, the transition data; and d) repeating steps b) and c), thereby causing the boundary function to shift over time.

Prior to describing specific embodiments of the invention, some terms may be described in detail.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

"Entities" may include things with distinct and independent existence. For example entities may include people, organizations (e.g., partnerships and businesses), computers, and computer networks, among others. An entity can communicate or interact with its environment in some manner. Further, an entity can operate, interface, or interact with a computer or computer network during the course of its existence. An entity may be a "data source," an entity that provides input data to a malicious computer or another entity during the course of its existence. An entity may be a malicious entity that intents to use a machine learning classifier to perform malicious actions. For example, the malicious entity may attempt to use a machine learning model classifier to perform CAPTCHAs such that the malicious entity can mass sign-up for email accounts. An entity may operate a data processor that generates transition data.

A "data processor" may include a computer or server computer that can perform a proactive defense of an untrustworthy machine learning system, such as a malicious computer. For example, the data processor can determine that a malicious computer, operated by a malicious entity, uses a machine learning model. The data processor can be configured to generate transition data intended to shift a boundary function of the machine learning model, and then provide the transition data to the malicious computer. Model shift can be induced in the malicious computer's machine learning model by the transition data.

A "malicious computer" may include a computer or server computer that evaluates input data using a machine learning model and is operated by a malicious entity. For example, the malicious computer can use machine learning to classify images or alphanumeric characters, producing classification data in the process. Additionally, a malicious computer may evaluate classification data and act based on the evaluation. For example, a malicious computer used to classify images may attempt to bypass a CAPTCHA requiring the correct selection of certain images or alphanumeric characters, in order to perform a malicious action.

A malicious computer may train, store, and manage machine learning models. These machine learning models may be stored in a model cache or database managed by the malicious computer. The malicious computer may train the machine learning models using labeled or unlabeled training data, including feature vectors stored in a "feature store" other appropriate feature vector database, or received from a data source, for example, scraped from a webpage on the Internet.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

A "model cache" may include a database that can store machine learning models. Machine learning models can be stored in a model cache in a variety of forms, such as collections of parameters or other values defining the machine learning model. Models in a model cache may be stored in association with keywords that communicate some aspect of the model. For example, a model used to evaluate news articles may be stored in a model cache in association with the keywords "news," "propaganda," and "information." A malicious computer can access a model cache and retrieve models from the model cache, modify models in the model cache, delete models from the model cache, or add new models to the model cache.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors in to multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

"Classification data" may include any data related to the classification of input data, feature vectors, objects, entities, etc. Classification data may be produced by a machine learning classifier, retrieved from a database, produced by a subject matter expert, or retrieved from any other appropriate source. Classification data may be probabilistic and may be mapped to a defined range, e.g., a news classifier may produce a score of "0" to indicate fake news, a score of "100" to indicate real news, and a score in between 0 and 100 to indicate some probability of real or fake news (such as a score of 80 to indicate an 80% probability that the news article is real news).

"Model shift" may refer to a change in the properties of a machine learning model, such as a change in a machine learning model over time. Model shift may include a change in how a machine learning model classifies or responds to input data. For example, a machine learning classifier may classify images as a cat or a dog, and model shift may correspond to a change in how the classifier classifies images, e.g., a change in a classification of a particular image from a cat to a dog. Model shift may be the result of changes in input data or the discovery of new information. In some cases, model shift may be induced by a data processor in order to achieve some desired end. For example, a data processor may attempt to induce model shift in a malicious entity's machine learning classifier that classifies images, in order to disrupt the malicious entity's ability to perform malicious actions, such as bypass a CAPTCHA.

"Transition data" may include input data used to induce model shift in a machine learning model. Transition data may be generated by a data source, such as a data processor that generates transition data in order to compromise the malicious entity's machine learning classifier. For example, a data processor may generate transition data in order to prevent an image classifier from differentiating between cats and dogs. As another example, a data processor may generate transition data in order to prevent a malicious alphanumeric classifier from differentiating between the number 6 and the letter G. Transition data may be generated such that it includes data items that share characteristics of data belonging to more than one classification, for example two different classifications. For example, an image that is largely accurate but contains deliberate errors.

"Normal data" may include input data used in a machine learning model. In some embodiments, normal data may be used to determine characteristics of a machine learning model. Normal data may be generated by a data source and/or a data processor that generates normal data in order to determine characteristics of a malicious computer's machine learning model. For example, a data processor may generate normal data corresponding to different classification labels in order to determine how a malicious support vector machine classifies different images. Normal data may be input data provided to non-malicious entities.

DETAILED DESCRIPTION

Figure 1:
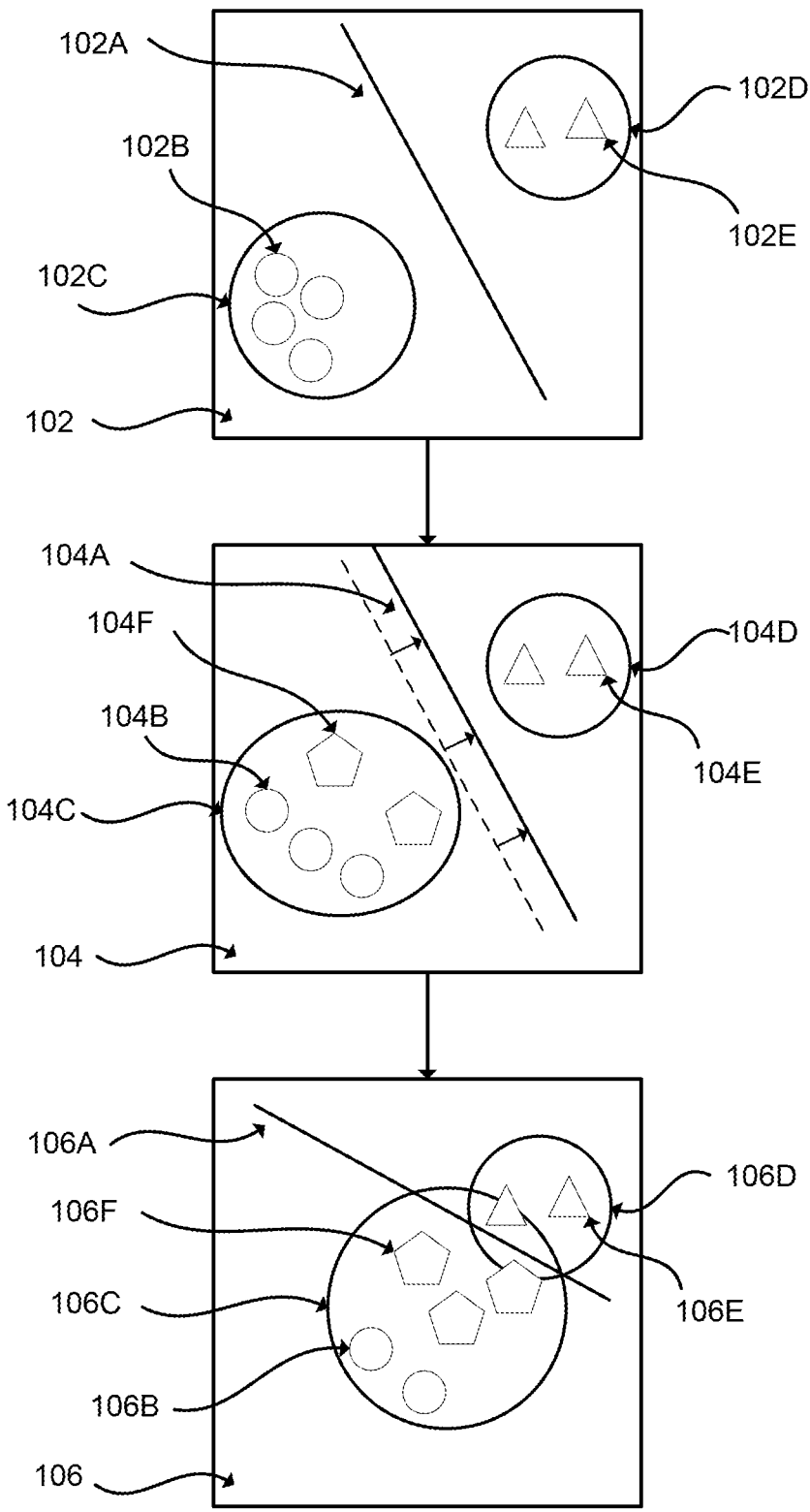
FIG. 1 shows an exemplary support vector machine state transition diagram according to some embodiments of the invention.

The following paragraphs introduce some concepts that may be helpful in understanding embodiments of the invention, model shift, and improvements over conventional methods and systems. An example of model shift is presented with reference to a simplified support vector machine in FIG. 1. Following this introduction, methods and systems according to embodiments will be described in greater detail with reference to FIGS. 2-6.

Current fraud prevention systems (such as CAPTCHA) are vulnerable to exploitation by malicious entities (e.g., hackers). By training a machine learning classifier, a malicious entity can produce classification data that allows the malicious entity to perform malicious actions. A malicious entity can use a machine learning classifier to classify images or alphanumeric characters in order to bypass CAPTCHA systems. For example, a CAPTCHA can present a range of images to a user that is trying to sign-up for an email address. The CAPTCHA can present 16 images, 5 of which include dogs. The system can prompt the user to select the 5 images of dogs and none of the other 11 images that may contain other objects, such as a cat. A malicious entity can use a machine learning classifier to classify images such that the malicious computer can select the 5 images of dogs out of the 16 images, thus bypassing the CAPTCHA.

Traditionally, the creation of static rules is used to enhance security of applications and prevent unwanted activity or fraud on the system. However, malicious entities have become better at figuring out these rules very quickly, using machine learning classifiers, and bypassing the controls in place. Even using a machine learning model simply results in a complex set of static rules.

Periodic retraining of the machine learning classifier can allow the malicious entity to keep up with recent data. For example, to keep up with the latest version of CAPTCHA alphanumeric obfuscation techniques. As a CAPTCHA system changes its method of obfuscating alphanumeric characters, the malicious entity can retrain the machine learning classifier to classify the new forms of obfuscated alphanumeric characters.

As a data processor, it is possible to exploit this vulnerability and corrupt the input data to bias future models of the malicious machine learning classifier. The data processor can cause a model shift in the malicious entity's machine learning classifier as the malicious entity attempts to bypass a CAPTCHA system. The resulting "model shift" can be used by the data processor in order to achieve some desired purpose, such as skewing a malicious entity's image and/or alphanumeric classification capabilities, limiting the malicious entity's speech recognition and natural language processing capabilities for advanced spear phishing emails, among others. For instance, in reference to FIG. 1, it can be assumed that there is a data set with different "zones" of classification. When the malicious computer receives new data, it can retrain the model to account for new behaviors. However, the data processor can influence data evaluated by the malicious computer. A data processor can determine what data is considered to be on the threshold between classifications and send in these events as transition data. This will force future retraining's of models to shift the decision boundary towards a particular classification, as seen in the second graph of FIG. 1. The data processor can continue sending event data until one classification zone intersects with the other classification zone, and the decision boundary is no longer useful, as an image classified as one classification can now be seen as the other classification.

The malicious computer can perform nightly training that produces a model that classifies between different data classifications. Data can begin to expire in favor of newer data points to learn current behavior. For example, the malicious entity may retain a machine learning classifier using new data regarding alphanumeric characters, which can result in more accurate classifications than outdated alphanumeric character classifications for an evolving CAPTCHA system. The malicious computer can retrain the machine learning model based on images presented in a CAPTCHA. For example, the malicious computer may use CAPTCHA images as input data after every 1, 5, 20, 100 attempts at performing the CAPTCHA. The data processor can send data that is "normal" but close to the threshold, e.g., hyperplane. This causes the new model to push the boundary further. The data processor can continue sending data nearing the decision function's threshold until the two classification are indistinguishable by the malicious computer's machine learning model.

As described above, model shift can comprise a change in the output of a machine learning model (such as a machine learning classifier) over time. While embodiments of the invention are directed to methods and systems for inducing model shifts in machine learning models of malicious entities, a model shift may not always be an undesirable outcome for the malicious entity. To elaborate, a machine learning model that is capable of model shift is capable of adapting to a changing environment, a characteristic that is helpful in a number of machine learning applications.

Self-learning is one method of achieving desirable model shift. A self-learning model can use its own classifications of input data as training data. This allows the model to continue to adapt to changes in input data over time. Moreover, self-learning is convenient and labor saving, as the malicious entity does not need to label new input data before it is used to train the model.

However, self-learning systems are vulnerable to deliberate attempts to influence the system via controlled input data, i.e., transition data. A data processor can generate transition data that can be provided to the malicious machine learning model with the intent of causing model shift. This model shift affects the machine learning model's ability to produce accurate outputs, such as classification of input data. As an example, a data processor can use transition data to induce a model shift in an image classifier, in order to prevent the image classifier from accurately detecting and classifying images.

Embodiments of the invention provide for an advantage over conventional machine learning systems because embodiments allow the creation of transition data used to induce model shift in a malicious entity's machine learning model. The data processor can be capable of determining that the malicious entity uses a machine learning model with a boundary function. The data processor can generate transition data in order to compromise a malicious entity's machine learning model. The data processor can also provide the transition data to the malicious computer, which can induce model shift in the machine learning model. In some embodiments, the data processor can generate normal data and provide the normal data to the malicious computer. The data processor can also determine characteristics of the machine learning model of the malicious computer based on classification data generated by the malicious machine learning model based on the normal data. The characteristics of the machine learning model can include the separations between clusters of different training data points, an estimate of the boundary function, a plurality of labels assigned to the normal data, or any other suitable values, and/or functions used in the machine learning model.

The concept of model shift may be better understood with reference to FIG. 1, which shows a state transition diagram corresponding to model shift in an exemplary support vector machine. A support vector machine is a machine learning model that can classify input data into two different categories, such as real news and fake news. In a support vector machine, the "feature space" is divided by a hyperplane. Input data is classified based on the position of a corresponding feature vector in the feature space, relative to the dividing hyperplane, i.e., the input data is classified with a first classification if the feature vector is located on one side of the hyperplane and the input data is classified with a second classification if the feature vector is located on the other side of the hyperplane. As a simplified example, the feature space for an image classifier may have two dimensions: average color and intensity gradient, although typically in real world applications, the feature space will have more than two dimensions. For a given image (input data), the feature vector (i.e., the average color and intensity gradient) can be determined. Generally, the features of the feature vector can be interpreted as coordinates in the feature space divided by the hyperplane.

In general terms, training a support vector machine involves determining the characteristics of the dividing hyperplane using labeled training data. The labeled training data can consist of feature vector classification pairs. For example, an average color and intensity gradient and a corresponding classification (e.g., dog). These classifications can be determined, for example, by a subject matter expert. Training a support vector machine involves determining the equation of a hyperplane that separates the training data based on its classification, and further maximizes the distance between the labelled training data and the hyperplane.

A self-learning support vector machine can use its own classifications of training data in order to train itself. For example, a self-learning support vector machine can be trained off a set of labeled training data. After an initial training, the support vector machine can classify input data. The support vector machine can label the input data using its classification, then retrain itself using the set of labelled training data and the newly classified input data. This retraining can occur at any appropriate rate or frequency, e.g., after a certain amount of input data is received, hourly, daily, etc.

In FIG. 1, state diagrams 102, 104, and 106 show the state of a support vector machine at different points in time, with state diagram 102 corresponding to an initial state (e.g., after the support vector machine has been trained with an initial set of training data), state diagram 104 corresponding to an intermediate state (e.g., after the support vector machine has been retrained with newly classified input data), and state diagram 106 corresponding to a final state (e.g., after the support vector machine has been retrained for a second time using newly classified input data). The state diagrams are a two-dimensional representation of the feature space of the support vector machine. In each state diagram 102, 104, and 106, a hyperplane (102A, 104A, and 106A) divides the feature space into two sides. Feature vectors corresponding to training data are represented by shapes (i.e., circles, triangles and pentagons) are grouped into data clusters 1020, 102D, 104C, 104D, 106C, and 106D. The circles represent feature vectors corresponding to input data of a first classification (e.g., images of dogs), and the triangles corresponding to input data of a second classification (e.g., images of cats). The pentagons represent feature vectors corresponding to transition data. Transition data is generated by a data processor to appear to belong to one classification (e.g., images of dogs) but possess qualities corresponding to the other classification, in order to induce model shift. In FIG.

1, the exemplary transition data appears to belong to the first classification, and as such is included in data clusters 104C and 106C.

As the data processor introduces transition data to the malicious support vector machine (e.g., transition data 104F and transition data 106F), the classified transition data is included in the training data and the model is retrained. Model shift occurs as data clusters and the hyperplane move as a result of the introduced transition data. As an example, data cluster 104C has grown and shifted to the right of data cluster 102C.

State diagram 102 shows the initial state of the support vector machine. In state diagram 102, a hyperplane 102A separates feature vectors corresponding to two classifications (e.g., feature vectors 102B and 102E), which are clustered in data clusters 102C and 102D. These feature vectors may have been part of a labeled, initial training data set provided to the support vector machine.

State diagram 104 shows the state of the support vector machine after transition data (e.g., feature vector 104F) has been introduced to the training data set. This transition data can be generated by a data processor in order to induce model shift. In some cases, transition data may generally resemble data belonging to one class (e.g., feature vector 104B), but may exhibit some characteristics corresponding to data of the second class (e.g., feature vector 104E). Transition data may comprise images of dogs that the data processor has altered to exhibit some characteristics of images of cats (e.g., feature vector 104E). As the transition data are on the left side of hyperplane 104A, the support vector machine may classify the transition data as belonging to the first class (e.g., dogs). However, as the transition data are closer to hyperplane 104A than other first class data points (e.g., feature vector 104B), the hyperplane shifts from its original position (e.g., hyperplane 102A) to a new position in order to increase the distance between the transition data and the hyperplane 104A. This new position is closer to the data points corresponding to the second class (e.g., feature vector 104E) and the volume or size of the feature space corresponding to the first classification increases. As a result, the proportion of input data classified as the first classification increases.

State diagram 106 shows the state of the support vector machine after additional transition data has been provided to the support vector machine. This new transition data (e.g., feature vector 106F) is even closer to feature vectors of the second classification, such as feature vector 106E. As a result, the clusters corresponding to the first class and the second class overlap, and the hyperplane 106A can only maintain a small distance between the two classes. Further, the side of the feature space corresponding to images of dogs is significantly larger than in either state diagram 102 or 104. As a result, data that belongs to the second class (e.g., cats) may incorrectly be classified as belonging to the first class (e.g., dogs).

Figure 2:
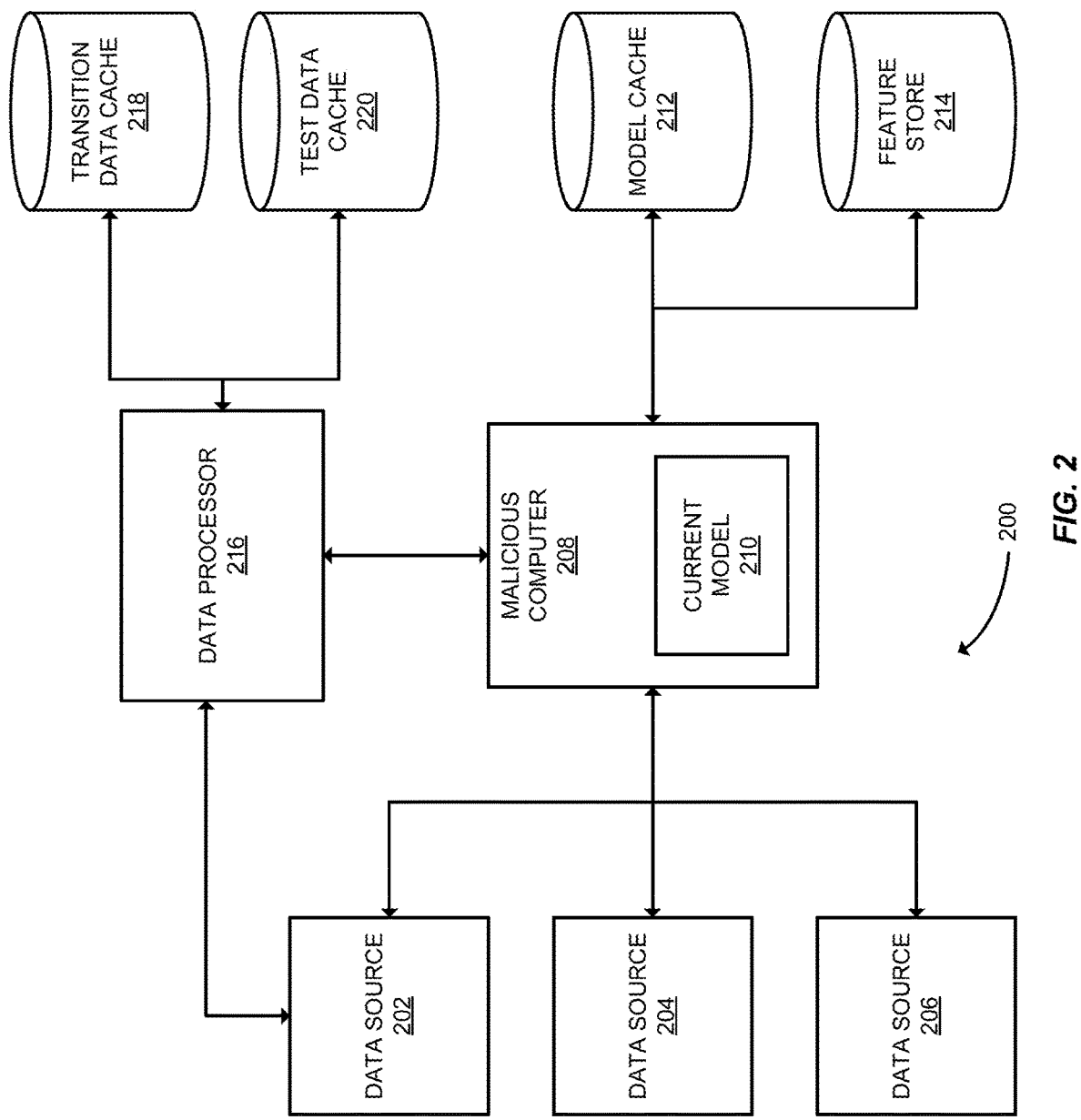
FIG. 2 shows a system block diagram of a data processing system according to some embodiments of the invention.

FIG. 2 shows a machine learning data processing system 200, comprising data sources 202, 204, and 206, a malicious computer 208 using a current machine learning model 210, a model cache 212, and a feature store 214. The machine learning data processing system 200 further comprises a data processor 216, a transition data cache 218, and a normal data cache 220. Although three data sources 202, 204, and 206 are shown, methods according to embodiments of the invention can be practiced with any number of data sources. FIG. 2 is intended to illustrate an example arrangement of databases, malicious computers, data processors, and data sources according to some embodiments of the invention, and is not intended to be limiting.

The databases, malicious computer, data processor, and data sources can communicate with one another via any appropriate means, including a communications network. Messages and other communications between the databases, data processor, and data sources may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL) and/or the like.

In general terms, the malicious computer 208 uses a current machine learning model 210 to evaluate input data produced by the data sources 202, 204, and 206 for some purpose. As an example, the malicious computer 208 may attempt to sign-up for 100,000 email accounts. However, the malicious entity is confronted with a CAPTCHA to slow down the fake email account creation rate. The malicious computer 208 may use the current machine learning model 210 to bypass the CAPTCHA system by automating the process rather than performing each CAPTCHA by hand. However, the current machine learning model 210 first needs to be trained. Data sources 202, 204, and 206 may be websites or data bases that generate input data in the form of images that are received by the malicious computer 208. For example, the malicious computer 208 can scrape a webpage for images to use as input data. The malicious computer 208 can use the current machine learning model 210 in order to produce classification data corresponding to the input data received from data sources 202, 204, and 206. As examples, the classification data could correspond to a classification such as a type of image (i.e., that the image contains a dog, cat, person, car, truck, building, computer, alphanumeric characters, any suitable object, and the like).

The malicious computer 208 can additionally retrain the current machine learning model 210 using the input data and the classification data, effectively allowing the current machine learning model 210 to learn from its own classifications. Further, the malicious computer 208 can retrieve data from databases such as the model cache 212 and feature store 214.

The model cache 212 can include any appropriate data structure for storing machine learning models, and may be implemented on a standalone computer or server computer, or implemented on one or more computer systems that also implement malicious computer 208. The machine learning models stored in model cache 212 may evaluate input data or feature vectors derived from input data and output corresponding classification data.

In some embodiments, each machine learning model may correspond to a data source, such that input data produced by each data source is modeled by a dedicated machine learning model. Additionally, the model cache 212 may store multiple machine learning models corresponding to each data source, such as a current machine learning model and a number of previously generated machine learning models. For example, each month the malicious computer 208 may train a new machine learning model corresponding to a data source. The newly generated machine learning model may be stored in the model cache 212 along with previously generated machine learning models corresponding to that data source.

Models in the model cache 212 may be stored in any appropriate form, such as a collection of parameters and/or weights (e.g., weights corresponding to a neural network machine learning model). Models in the model cache 212 may be indexed by a corresponding entity identifier, a model identifier, or the "type" or machine learning model (e.g., recurrent neural network, isolation forest, support vector machine, etc.). Models stored in the model cache 212 may be retrieved, trained, and/or used to evaluate input data by the malicious computer 208. The models may be trained on labeled feature vectors stored in the feature store 214. Further, the malicious computer 208 may retrieve a plurality of previously generated machine learning models stored in the model cache 212 for the purpose of evaluating the performance of the current machine learning model 210.

The feature store 214 may be any appropriate data structure for storing labeled or unlabeled feature vectors. The feature store 214 may be implemented on a standalone computer or server computer, or implemented on one or more computer systems that implement the malicious computer 208. The feature vectors in the feature store 214 may comprise feature vectors corresponding to input data paired with classification data, e.g., a feature vector corresponding to an image paired with a classification such as image of a cat. The feature vectors in the feature store 214 may be used by the malicious computer 208 to train the current machine learning model 210, as well as other machine learning models stored in the model cache 212. Additionally, the malicious computer 208 may write received input data, along with corresponding classification data as labelled feature vectors to the feature store 214. The labelled feature vectors may be used to train or validate the current machine learning model 210 at a later time.

The data processor 216 can be configured to determine that a malicious computer uses a machine learning model with a boundary function. The machine learning model can be any suitable machine learning model as described herein. The data processor 216 can be configured to identify the malicious computer, for example, by identifying malicious or potentially actions performed by the malicious computer. The data processor 216 can also be configured to generate transition data intended to shift the boundary function, and provide the transition data to the malicious computer, thereby causing the boundary function to shift. The data processor 216 can also retrieve and store data from databases such as the transition data cache 218 and the normal data cache 220.

In some embodiments, the data processor 216 can be capable of presenting users with a CAPTCHA. Upon successful completion of the CAPTCHA, the user can access a system and/or data. The data processor 216 can use different data sets for the CAPTCHA system, for example, a normal data set and a transition data set. The data processor 216 may typically present a CAPTCHA system with the normal data set, however, upon determination of a malicious computer 208, the data processor 216 may present a CAPTCHA system with the transition data.

The transition data cache 218 can include any appropriate data structure for storing transition data, and may be implemented on a standalone computer or server computer, or implemented on one or more computer systems that also implement the data processor 216. The transition data stored in the transition data cache 218 may include both previously used transition data as well as recently generated transition data. For example, each time that the data processor 216 generates transition data intended to shift a malicious computer's boundary function, the data processor 216 can store the transition data in the transition data cache 218. The data processor 216 may be capable of tracking the changes in transition data sent to a particular malicious computer over time.

The normal data cache 220 can include any appropriate data structure for storing normal data, and may be implemented on a standalone computer or server computer, or implemented on one or more computer systems that also implement the data processor 216. The normal data stored in the normal data cache 220 may include both previously used normal data as well as recently generated normal data. For example, the normal data cache 220 can be a database comprising labeled and unlabeled images.

Figure 3:
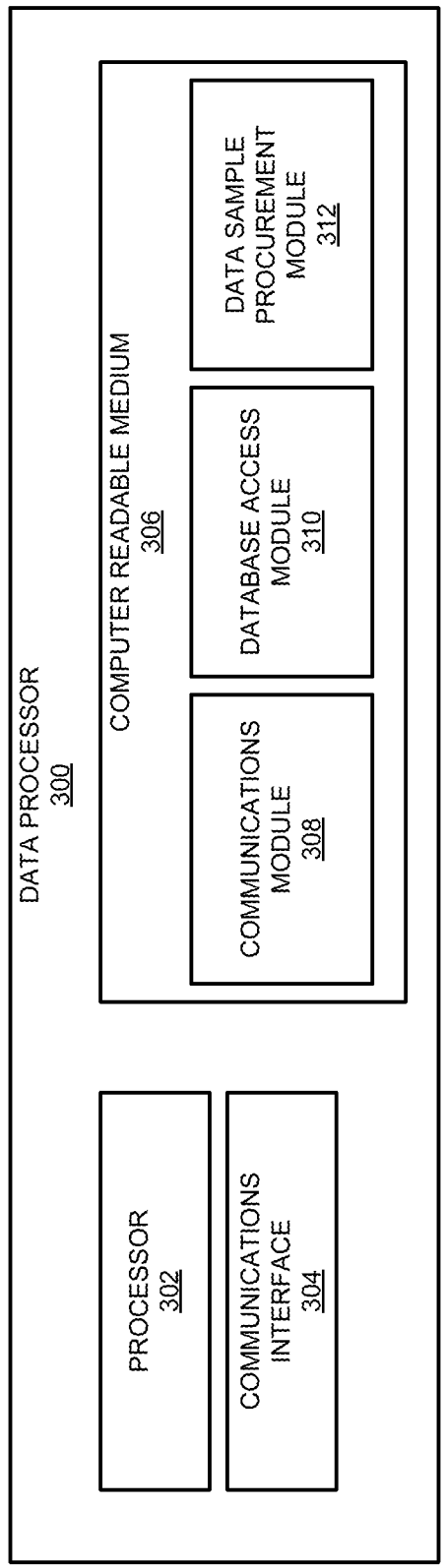
FIG. 3 shows a block diagram of a data processor according to some embodiments of the invention.

FIG. 3 shows an exemplary data processor according to some embodiments of the invention. The data processor 300 may comprise a processor 302, a communications interface 304, and a computer readable medium 306. The computer readable medium 306 may comprise a number of software modules, including a communications module 308, a database access module 310, and a data sample procurement module 312.

The processor 302 may be any suitable processing apparatus or device as described herein. The communications interface 304 may comprise a network interface that enables the data processor 300 to communicate with other computers or systems over a network such as the Internet.

The communications module 308 may comprise code or software, executable by the processor 302 for enabling communications between the data processor 300 and other entities, including data sources and, in some embodiments, malicious computers. The data processor 300 may use the communications module 308 to transmit input data, such as transition data and/or normal data, to data sources. In some embodiments, the data processor 300 may use the communications module 308 to transmit transition data and normal data to malicious computers. Further, the communications module 308 may comprise code or other features used to disable, prevent, or block communications from external entities to data processor 300. For example, the communications module 308 may include a whitelist file, containing a list of approved entities and their corresponding electronic addresses (e.g., IP addresses) that are allowed to communicate with the data processor 300. Alternatively or additionally, the communications module 308 may include a blacklist file, containing a list of entities that are not permitted to communicate with data processor 300.

The database access module 310 may comprise code or software, executable by the processor 302 for accessing databases, such as a transition data cache or a normal data cache, as depicted in FIG. 2. The data processor 300 may use the database access module 310 in order to retrieve and store transition data and normal data in the transition data cache and the normal data cache, respectively. Additionally, the database access module 310 may be used by the data processor 300 in order to modify or delete records in a database.

The data sample procurement module 312 may comprise code or software, executable by the processor 302 for generating and/or retrieving data samples. The data processor 216 can generate normal data using the data sample procurement module 312. For example, in the case of image data, the data sample procurement module 312 can generate an appropriate image (e.g., an image of a dog, cat, car, etc.) which can be labeled either by a subject matter expert or a machine learning model. In other embodiments, the normal data can be retrieved from a data source, such as data source 202 in FIG. 2. For example, the data processor 300 can retrieve 50 images of dogs, 40 images of cats, 70 images of cars, and 20 images of trucks from a data source such as a webpage. The data processor 300 can retrieve any suitable amount of normal data from a data source.

The data processor 216 can also generate transition data using the data sample procurement module 312. For example, the data sample procurement module 312 can generate transition data such as an image that may result in classification data (after being labeled in a malicious machine learning model) that may correspond to a low probability that the image belongs to a given class. For example, an image of a dog that may be classified with a 50% probability that the transition data corresponds to an image of a dog. As another example, the data sample procurement module 312 may merge two images, one image of a dog and one image of a cat. The resulting merged image may be transition data that shares characteristics of data belonging to more than one classification, for example images of dogs and images of cats.

Figure 4:
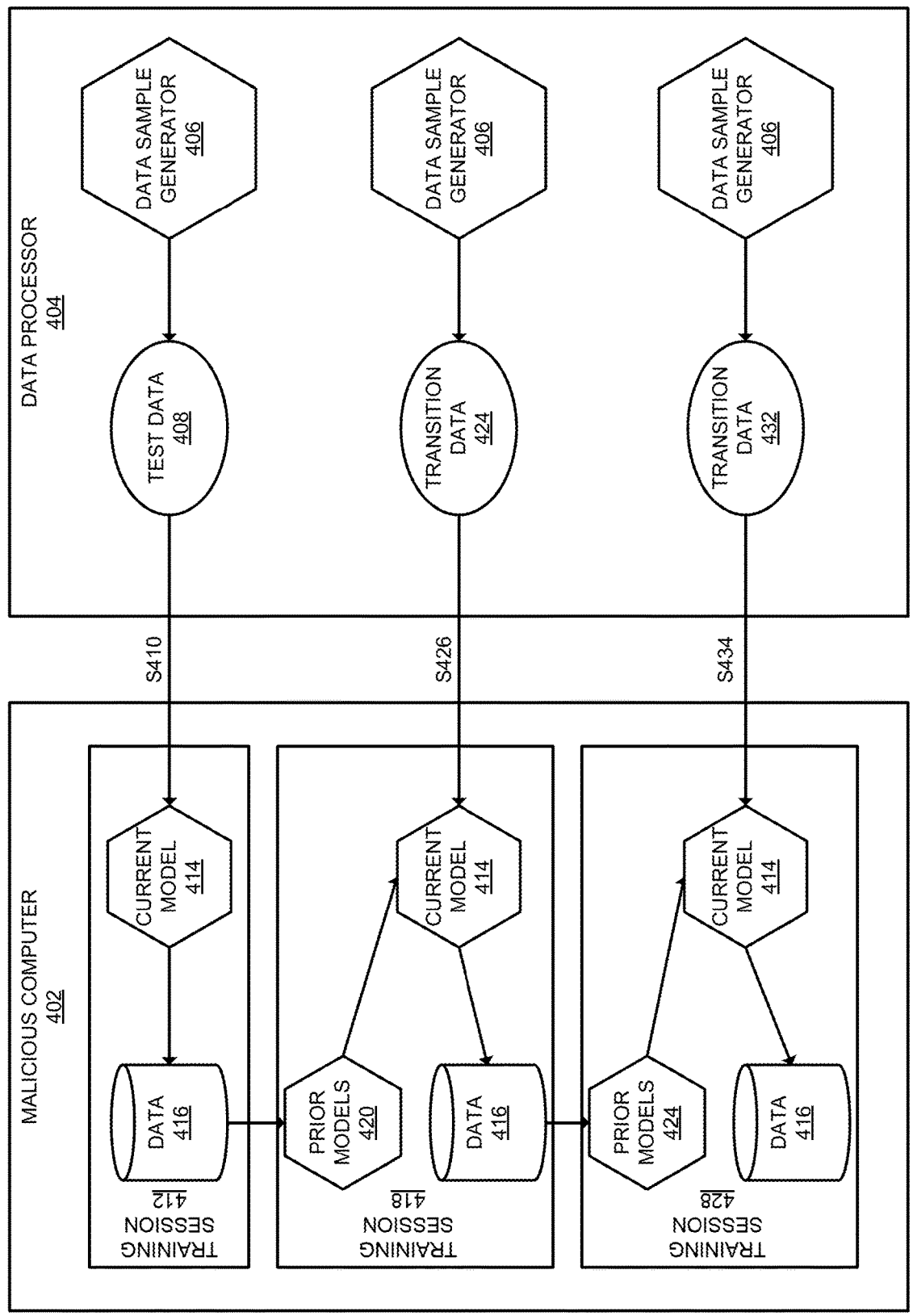
FIG. 4 shows a hybrid block diagram of an interaction between a data processor and a malicious entity according to embodiments of the invention.

FIG. 4 shows a hybrid block diagram of an interaction between a data processor and a malicious entity according to embodiments of the invention. The method illustrated in FIG. 4 will be described in the context of a data processor that intends to induce model shift in a malicious computer's machine learning model. The machine learning model can be a support vector machine. It is understood, however, that the invention can be applied to other circumstances (e.g., the machine learning model can use linear regression, logistic regression, decision trees, support vector machines, naive Bayes, kNN, K-means, random forests, and the like that employs supervised learning, unsupervised learning or reinforcement learning, etc.). Although the steps are illustrated in a specific order, it is understood that embodiments of the invention may include methods that have the steps in different orders. In addition, steps may be omitted or added and may still be within embodiments of the invention.

The data processor 404 can determine that a malicious computer 402 uses a machine learning model (e.g., a current model 414). The machine learning model can include a boundary function used to determine outcomes, such as a classification of input data. The data processor 404 can determine that the malicious computer 402 is associated with malicious and/or potentially malicious actions that are performed using a machine learning model. For example, the data processor 404 may detect a high rate of CAPTCHA attempts in a short amount of time by the malicious computer 402. The data processor can determine that the machine learning model is a support vector machine, the boundary function is a hyperplane, and that the hyperplane separates a plurality of classifications.

The data processor 404 may generate and send normal data 408 to the malicious computer 402 at step S410. For example, the normal data 408 can be presented to the malicious computer 402 via a CAPTCHA. The data processor 404 may send this normal data 408 in order to determine how the current model 414 of the malicious computer 402 classifies normal input data. The data processor can communicate with the malicious computer 402 via a network such as the Internet, using, for example, an application programming interface (API). The normal data 408 can be transmitted in any appropriate form, e.g., encrypted, unencrypted, compressed, etc. The data processor 404 may evaluate the resulting classification data in order to learn enough information about the current model 414 in order to generate transition data 424 and 432 that can be used to induce model shift in the current model 414. For example, the normal data 408 can include typical input data corresponding to the type of current model 414. For example, if the current model 414 is an image classifier, then the normal data can comprise any suitable number of images, such as images of dogs, cats, cars, building, objects, and the like. As another example, if the current model 414 is an alphanumeric character classifier, then the normal data can comprise any suitable number of alphanumeric characters.

After receiving the normal data 408 at step S410, the malicious computer 402 can classify the normal data 408 using the current model 414. The malicious computer 402 can produce a set of classification data. The malicious computer 402 can retrain the current model 414 using the classification data. Afterwards, during a first training session 412, the normal data 408 and the classifications can be stored in database 416, which may be a database such as feature store 214 from FIG. 2.

After the first training session 412, the data processor 404 can obtain the classification data. The data processor 404 can obtain the classification data in any suitable manner. For example, the malicious computer 402 may perform the presented CAPTCHA, by selecting images of a particular type, e.g., images of dogs. The selection of images by the malicious computer 402 can reflect the classifications of the current model 414.

In some embodiments, the malicious computer 402 may perform a malicious action using the current model 414. The data processor 404 can evaluate the malicious action and determine the classification data based on the malicious action and the normal data 408.

As another example, the data processor 404 may be operatively coupled to a server computer that executes the CAPTCHA that is meant to limit the rate at which email accounts are created. The malicious computer 402 may attempt to perform a CAPTCHA to test the capabilities of the current model 414 after the first training session 412. The server computer can present the CAPTCHA to the malicious computer 402. The malicious computer 402 can attempt to perform the CAPTCHA. The server computer can log data from the attempt, such as which images were selected, what alphanumeric characters were submitted, or other suitable attempt data. The data processor 404 can obtain, or otherwise receive, the attempt data from the server computer. The data processor 404 can then evaluate the attempt data and may determine classification data based on the attempt data. In some embodiments, the data processor 404 may be able to determine the effect of the normal data 408 on the current model 414.

The data processor 404 can evaluate the classification data in order to learn enough information about the current model 414 in order to generate transition data 424 that can be used to induce model shift in the current model 414. The data processor 404 can generate transition data 424 using a data sample generator 406. The data sample generator 406 can be, for example, the data sample procurement module 312, described herein. The data processor 404 may have learned about the characteristics of the current model 414 using the normal data 408, e.g., the separations between clusters of different training data points, an estimate of the equation of a hyperplane for a support vector machine, etc. As such, the data processor 404 may have determined the characteristics of transition data that will successfully induce model shift in the current model 414. These characteristics may include, for example, statistical qualities, such as the difference between the transition data 424 and an average data point corresponding to the training data set. The data processor 404 may provide the transition data 424 to the malicious computer 402 at step S426.

During a second training session 418, using the current model 414, the malicious computer 402 may classify the transition data 424 and produce a set of classification data, then use the transition data 424 and the classification data to retrain the current model 414, inadvertently inducing model shift in the process. The transition data 424 and corresponding classification data can be stored in database 416. The transition data 424 may be received from one or more data sources and may be in any appropriate form. In some embodiments, the malicious computer 402 may normalize, clean, or otherwise process the transition data 424 before applying the transition data 424 to the current model 414. For example, the malicious computer 402 may process the transition data 424 in order to generate a feature vector that is applied to the current model 414. As another example, the input data may be a uniform resource locator (URL), such as the address of a website. The malicious computer 402 may follow the URL, extract the contents of the website including the transition data 424, generate a feature vector based on the contents of the website, and apply the feature vector as an input to the current model 414.

The current model 414 may be any appropriate machine learning model, such as a support vector machine, isolation forest, etc. Additionally, the current model 414 may be an ensemble model comprising a number of different machine learning models, e.g., an ensemble comprising an isolation forest and a support vector machine. The current model 414 may be stored in a model cache and may be retrieved by the malicious computer 402 prior to applying the set of input data (e.g., transition data 424) to the current model 414. The current model 414 may be stored in the model cache as a collection of parameters or weights that characterize the machine learning model, or may be stored in any other suitable form. The current model 414 may be retrained regularly, e.g., each hour, each night, after a certain amount of input data has been received (e.g., 200 MB), etc.

The current model 414 can produce a first set of classification data using the input data or feature vectors derived from the transition data 424. The classification data may comprise a binary classification, such as "fake news" or "real news." Alternatively, the classification data may comprise a classification that can take on more than two values, e.g., for an animal classifier, "cat," "dog," "rabbit," etc. As another alternative, the classification data can take on a continuous range of values, e.g., 0-100%. The classification data may correspond to the probability that the input data belongs to a given class. For example, classification data of "95%" for a news classifier may correspond to a 95% probability that the input data corresponds to a fake news article, and a 5% probability that the input data corresponds to a real news article. As another example, classification data of "90%" for an image classifier may correspond to a 90% probability that the input data corresponds to a particular classification. An image may correspond to classification data of 90% probability that the image is an image of a dog, whereas a different image may correspond to classification data of 70% probability that the image is an image of a car.

The malicious computer 402 can train the current model 414 using the set of input data and first set of classification data. The malicious computer 402 may generate one or more labeled training data points from the transition data 424 (or feature vectors derived from the transition data 424) and the first set of classification data. The malicious computer 402 may store the one or more labeled training data points in a feature store for later use in training and evaluating machine learning models, for example, in a third training session 428. The training process may depend on the nature of the current model 414. For example, for a support vector machine, the training process may involve determining a hyperplane that separates feature vectors corresponding to one label (e.g., a character is a number) from feature vectors corresponding to another label (e.g., a character is a letter).

After the malicious computer 402 performs the second training session 418, the data processor 404 can generate transition data 432 using data sample generator 406. The data processor 404 may have learned about the characteristics of the current model 414 using the normal data 408, e.g., the separations between clusters of different training data points, an estimate of the equation of a hyperplane for a support vector machine, etc. As such, the data processor 404 may have determined the characteristics of transition data that will successfully induce model shift in the current model 414. These characteristics may include, for example, statistical qualities, such as the difference between the normal data 408 and an average data point corresponding to the training data set.

For example, in some embodiments, the data processor 404 can determine a plurality of labels assigned to the normal data 408 by the current model 414 of the malicious computer 402. The plurality of labels assigned to the normal data 408 can be labels assigned to each data item in the normal data 408 by the current model 414. A label can be a classification assigned to a data item by a machine learning model (e.g., the current model 414). For example, the data processor 404 can determine if an image of a dog, included in the normal data 408, was classified and labeled as a dog. The data processor 404 can receive the classification data by the malicious computer 402 submitting the classification data as a selection in a CAPTCHA. In some embodiments, the data processor 404 can be capable of determining the boundary function used in the current model 414.

After determining characteristics of the current model 414, the data processor 404 can generate transition data 424 using the data sample generator 406. The transition data 424 can include data that is close to the boundary function. For example, an alphanumeric character of the number 6 that includes characteristics of the letter G. The data processor 404 can then transmit the transition data 424 to the malicious computer 402 at step S434.

During a third training session 428, the malicious computer 402 may retrieve previously generated machine learning models from a model cache or other suitable database (e.g., prior machine learning models 420). The malicious computer 402 may retrieve the transition data 424 and corresponding classifications from database 416, and may apply the transition data 424 as an input to the prior machine learning models 420. The malicious computer 402 may classify the transition data 432 and also train the current model 414 using the transition data 432.

After the malicious computer 402 performs the third training session 428, the boundary function may have shifted towards a particular classification. One classification zone may intersect with another classification zone, thus rendering the boundary function no longer useful. In some embodiments, the data processor 404 can continue to provide transition data, each new transition data including data that can be classified closer to a different classification than the previous transition data. This can happen over time such that the malicious computer 402 does not recognize the model shift.

Figure 5:
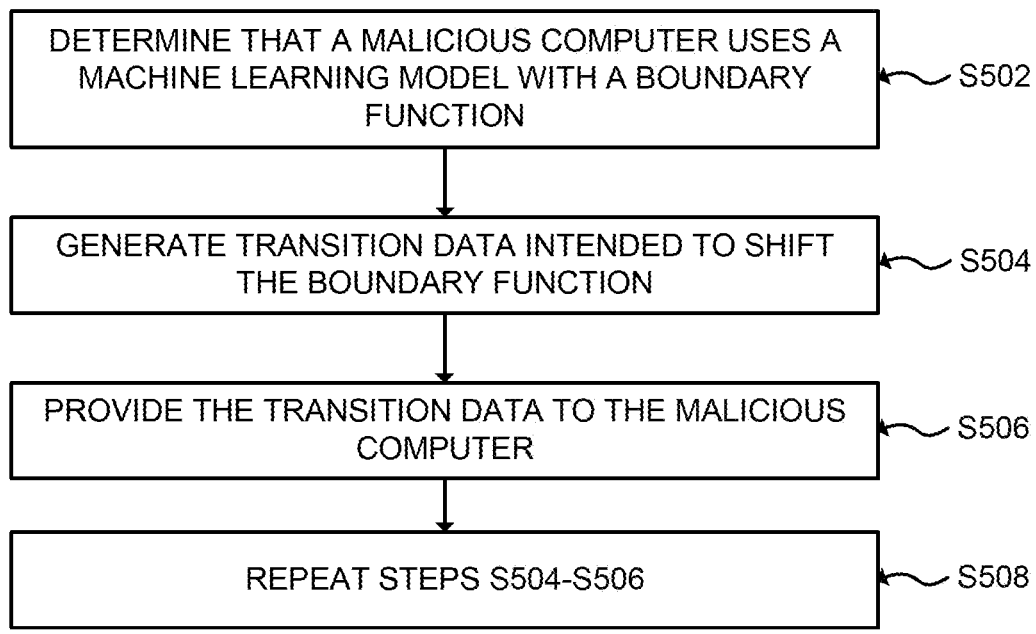
FIG. 5 shows a method of inducing model shift in a malicious entity's machine learning model according to embodiments of the invention.

FIG. 5 shows a method of inducing model shift in a malicious entity's machine learning model according to embodiments of the invention. The method illustrated in FIG. 5 will be described in the context of a data processor intending to disrupt a machine learning model at a malicious computer. The malicious computer may intend to bypass CAPTCHA meant to block scripts from mass signing-up for email accounts. The malicious computer may construct a machine learning model to classify images in order to allow the model to determine the characters in the CAPTCHA. The data processor may employ a first CAPTCHA using normal data and a second CAPTCHA using transition data. It is understood, however, that the invention can be applied to other circumstances (e.g., different malicious intentions by the malicious computer, other types of machine learning models, etc.). Although the steps are illustrated in a specific order, it is understood that embodiments of the invention may include methods that have the steps in different orders. In addition, steps may be omitted or added and may still be within embodiments of the invention.

At step S502, the data processor can determine that a malicious computer uses a machine learning model with a boundary function. The data processor can determine the malicious computer using any suitable method. For example, the data processor can determine that an Internet protocol (IP) address associated with the malicious computer has attempted a higher than average number of CAPTCHAs in the past hour at 2 AM. The data processor can determine that the malicious computer is using a machine learning model with a boundary function, such as an SVM, since the malicious computer is attempting to bypass the CAPTCHA (using the normal data) meant to prevent automated scripts from signing-up for large amounts of email addresses.

At step S504, after determining the malicious computer, the data processor can generate transition data. The transition data can be intended to shift the boundary function of the malicious computer's machine learning model. The transition data can be input data used to induce model shift in a machine learning model. For example, the data processor can generate the transition data in order to prevent the malicious computer's image classifier from differentiating between images of dogs and images of cats. The transition data can be generated such that it shares characteristics of data belonging to both of the classifications of images of dogs and of images of cats. The transition data can include any suitable number of images, for example, 1 image, 3 images, 10 images, 16 images, 25 images, etc.

As another example, the data processor can generate the transition data in order to prevent the malicious computer's alphanumeric classifier from differentiating between the number 4 and the number 8. The transition data can be generated such that it shares characteristics of data belonging to both of the classifications of the number 4 and the number 8. The transition data can include any suitable number of data items, each data item being a different alphanumeric character. The transition data can, for example, include 5 data items, 10 data items, 45 data items, 100 data items, 1000 data items, or any other suitable number of data items.

At step S506, after generating the transition data, the data processor can provide the transition data to the malicious computer. The malicious computer can receive the transition data in any suitable manner. For example, the data processor can present a CAPTCHA with the transition data to the malicious computer.

As another example, the data processor can provide the transition data to the malicious computer via a webpage known to be scraped for data. The malicious computer may scrape written and/or digitally generated numerals from webpages to use for training a machine learning model capable of determining numerals. The malicious computer can extract the contents of the webpage, unknowingly extracting the transition data provided by the data processor.

After the malicious computer receives the transition data, the malicious computer can generate a feature vector based at least the transition data, and apply the feature vector as an input to the current machine learning model. The boundary function of the current machine learning model can be shifted due to the transition data. The data processor has induced model shift in the machine learning model of the malicious computer.

At step S508, the data processor can repeat steps S502-S506 any suitable number of times to continue to induce model shift in the machine learning model of the malicious computer. For example, the data processor can continue providing transition data nearing the decision function's threshold until two classification are indistinguishable by the malicious computer's machine learning model. At this point, the machine learning model may classify one type of image as another, for example, images of dogs as images of cats. As another example, the machine learning model may classify the number 4 as the number 8, thus inhibiting the malicious computer from performing malicious actions with the machine learning model. However, it is understood that more than two classifications can be skewed due to model shift. For example, in a numeral classifier, after the data processor induces model shift, the number 1 may be classified as the number 7, the number 5 may be classified as the number 2, the number 9 may be classified as the number 6, and any other shifted classifications.

It is understood that embodiments of the invention are not limited to the data processor using a CAPTCHA and the malicious computer using a machine learning model that is an image classifier. As another example, in other embodiments of the invention, the malicious entity may be targeting an entity with malicious phishing emails. The malicious entity may train a machine learning model on responses to the phishing emails in order to determine how to best scam a person. The data processor may transmit transition data to the malicious computer. The data processor can determine transition data based on how the malicious computer responds to the data processor's responses. In this case, the transition data may be responses to the phishing emails including statements, sentences, and/or words that may share characteristics of data belonging to more than one classification, for example, sentences that are largely accurate but contain deliberate grammatical errors. As another example, the transition data can be sentences that are mainly about one topic (e.g., free money) but contain deliberate references to another topic (e.g., false advertising). In this way, the malicious computer may conflate the topics of "free money" and "false advertising" and include them in the same sentences in future phishing emails to victims, who have a chance of realizing that the free money may be false advertising. Thus diminishing the malicious computer's ability to scam victims using phishing emails.

Figure 6A:
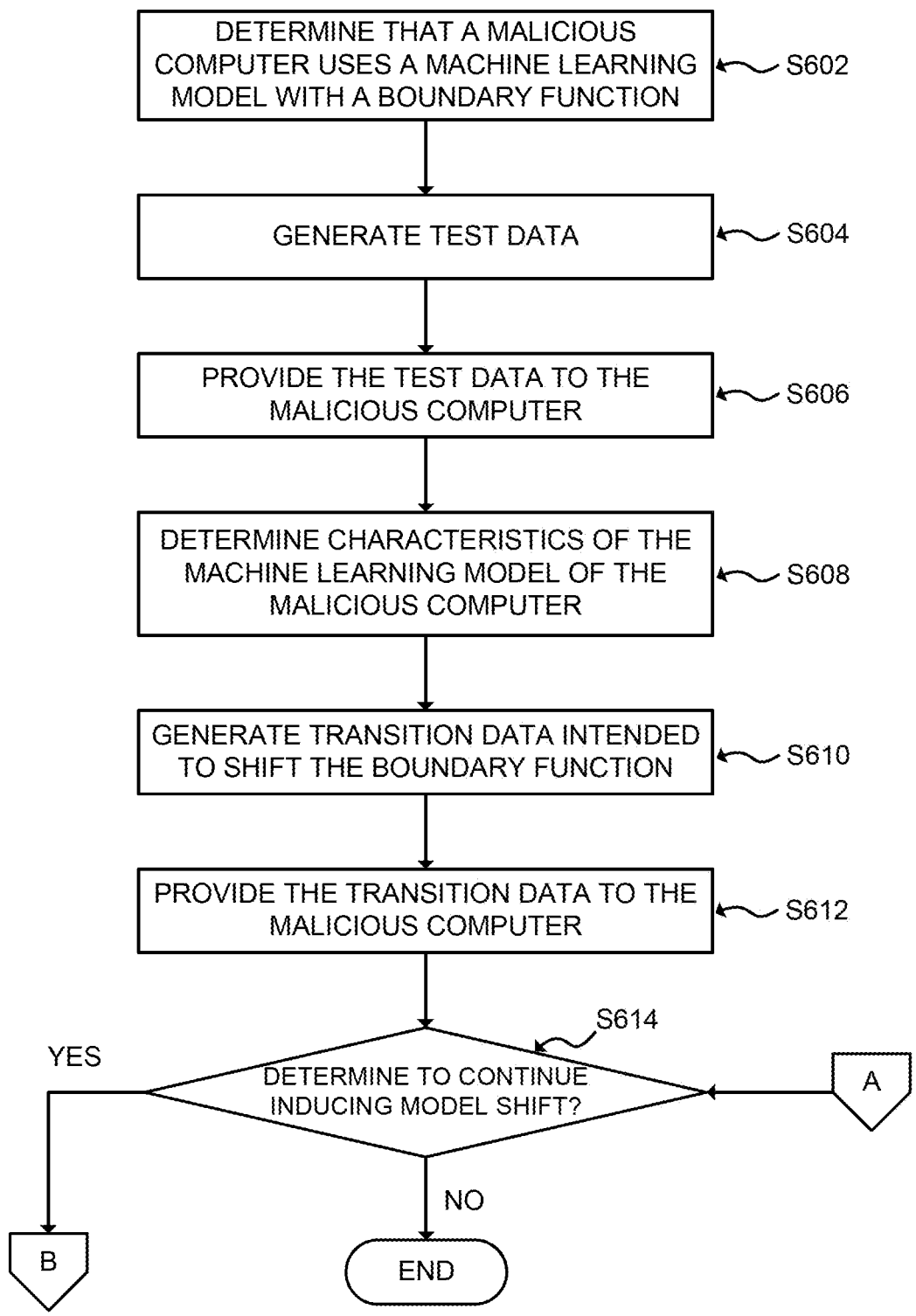
FIG. 6A shows a method of inducing model shift over time according to embodiments of the invention.
Figure 6B:
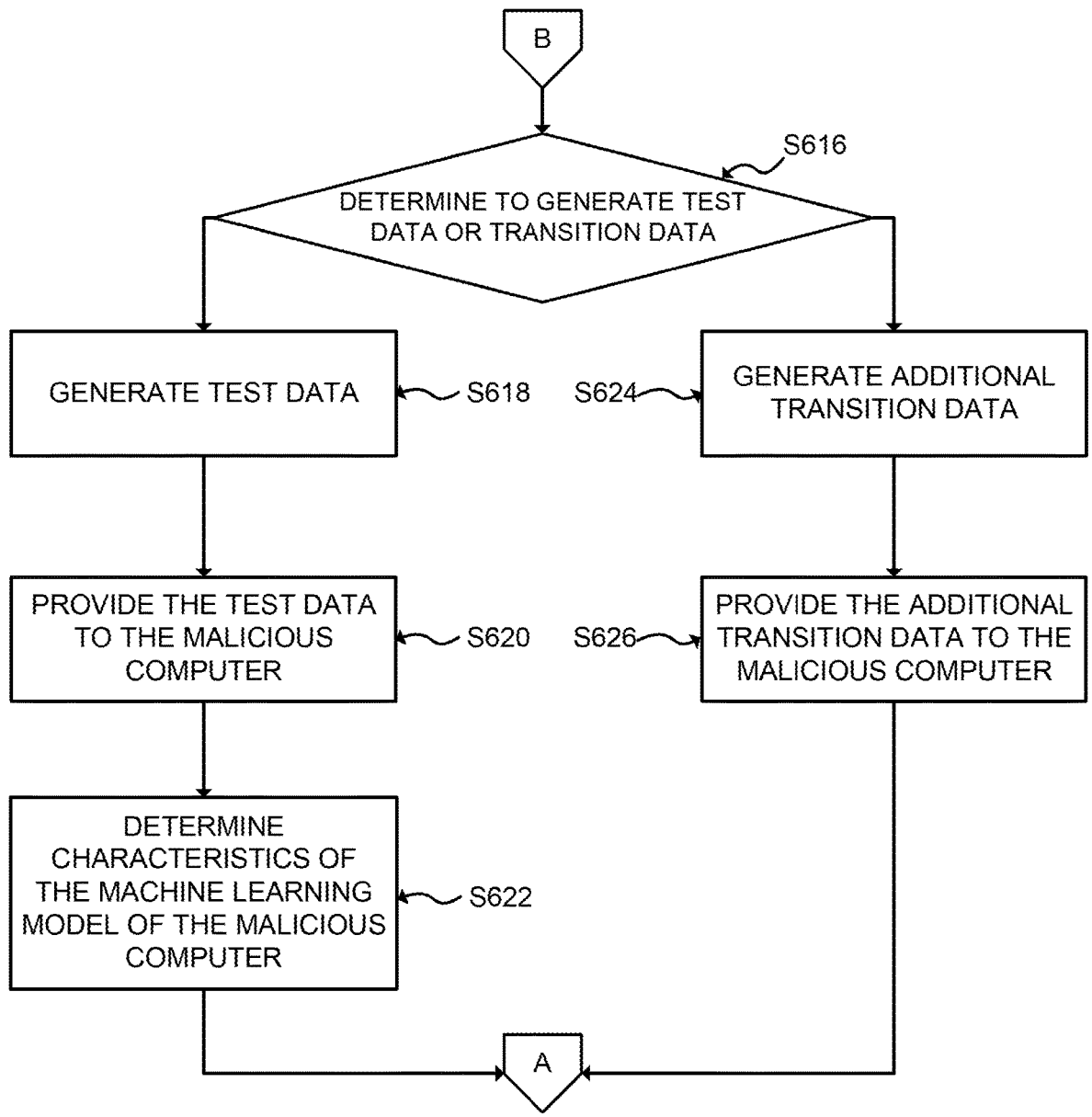
FIG. 6B shows a method of inducing model shift over time according to embodiments of the invention.

FIGS. 6A and 6B show a method of inducing model shift over time according to embodiments of the invention. The method illustrated in FIGS. 6A and 6B will be described in the context of a data processor providing both normal data and transition data to a malicious computer over many iterations to induce model shift in a malicious self-learning model over time. Although the steps are illustrated in a specific order, it is understood that embodiments of the invention may include methods that have the steps in different orders. In addition, steps may be omitted or added and may still be within embodiments of the invention.

At step S602, the data processor can determine that the malicious computer uses a machine learning model with a boundary function. In some embodiments, the data processor can store a list of malicious or potentially malicious computers comprising the IP address, or other identifier, of malicious or potentially malicious computers. The data processor can determine a malicious computer based on the list of malicious computers. In other embodiments, the data processor can detect malicious or potentially malicious activities performed by a malicious computer. For example, the malicious computer may associated with an email address that has begun sending out advanced spear phishing emails to entities associated with the data processor.

Once a computer has been determined to be malicious, the data processor can then proceed with the remaining steps in FIGS. 6A and 6B. If a computer is not determined to be malicious, then the remaining steps may not be performed in some embodiments, and non-malicious computers may be presented with normal data. This may necessitate presenting different data to known or potentially known malicious computers, as compared to non-malicious computers. For example, if the data provided include CAPTCHA challenges or images, then a site may present one set of images to a non-malicious computer, while a different set of images may be presented to a malicious or potentially malicious computer.

At step S604, after determining the malicious computer, the data processor can generate normal data. In some embodiments, the data processor can generate normal data using the data sample procurement module 312. For example, in the case of image data, the data sample procurement module 312 can generate an appropriate image (e.g., an image of a dog, cat, car, truck, desk, etc.) which can be labeled either by a subject matter expert or a machine learning model. In other embodiments, the normal data can be retrieved from a data source, such as a webpage. In yet other embodiments, the data processor can retrieve the normal data from a normal data cache 220. The normal data can include any suitable number of data items. For example, normal data including images of various objects can include 10 images, 100 images, 500 images, 1000 images, or any other suitable number of images.

At step S606, after generating the normal data, the data processor can provide the normal data to the malicious computer. In some embodiments, the data processor can directly provide the normal data to the malicious computer by transmitting the normal data to the malicious computer. In other embodiments, the data processor can provide the normal data to a data source used by the malicious computer. The malicious computer can then retrieve input data including the normal data from the data source. The normal data can be transmitted in any appropriate form, e.g., encrypted, unencrypted, compressed, etc.

The malicious computer can classify the normal data using the machine learning model, to produce classification data. The malicious computer can then train the machine learning model using the normal data and the classification data. After the malicious computer trains the machine learning model, the data processor can obtain classification data.

For example, the data processor can receive additional advanced spear phishing emails, from the malicious computer, generated after training the machine learning model with the normal data. In some embodiments, the data processor can receive data, from the malicious computer, based on the output of the machine learning model.

At step S608, the data processor can determine characteristics of the machine learning model. For example, the data processor can learn about the characteristics of the machine learning model using the normal data and the classification data. The characteristics can include the separations between clusters of different training data points, an estimate of the equation of a hyperplane for a support vector machine, etc.

At step S610, after determining characteristics of the machine learning model, the data processor can generate transition data. The data processor can generate the transition data based on the characteristics of the machine learning model determined in step S608. As such, the data processor can determine the characteristics of transition data that will successfully induce model shift in the machine learning model. These characteristics may include, for example, statistical qualities, such as the difference between the transition data and an average data point corresponding to the training data set. The transition data can include data items that when classified are close to or substantially near the boundary function.

At step S612, after generating the transition data, the data processor can provide the transition data to the malicious computer. The data processor can provide the transition data in any suitable manner described herein. After the data processor provides the transition data to the malicious computer, the malicious computer can classify the transition data to produce classification data. The malicious computer can then train the machine learning model using the transition data and the classification data, thus unintentionally inducing model shift.

At step S614, after providing the transition data to the malicious computer, the data processor can determine to continue inducing model shift in the malicious computer's machine learning model. If the data processor determines to continue inducing model shift, then the data processor can proceed to step S616 in FIG. 6B. Otherwise, the data processor can determine that the machine learning model's boundary function has been sufficiently shifted, thus diminishing the malicious computer's ability to perform malicious actions.

At step S616, after determining to continue inducing model shift, the data processor can determine whether to generate normal data or transition data to provide to the malicious computer. The data processor can determine which data to generate based on the known characteristics of the machine learning model. For example, if the data processor has little information about the characteristics of the machine learning model, then the data processor determine to generate normal data to further examine the machine learning model. The data processor can otherwise determine to generate transition data. If the data processor has information about the characteristics of the machine learning model, then the data processor can determine to generate transition data intended to induce model shift.

At step S618, after determining to generate normal data, the data processor can generate normal data. For example, the data processor may generate normal data corresponding to different classification labels in order to determine how a malicious support vector machine classifies different images. At step S620, the data processor can provide the normal data to the malicious computer, as described herein.

The data processor can provide the normal data to a data source used by the malicious computer. In some embodiments, the malicious computer can generate a feature vector based at least upon the normal data, and apply the feature vector as an input to the malicious computer's machine learning model. The machine learning model can produce classification data using the input data or feature vectors derived from the normal data. The malicious computer can then retrain the machine learning model with the normal data, or feature vector determined therefrom, and with the classification data.

At step S622, after the malicious computer has evaluated the normal data using the machine learning model, the data processor can determine characteristics of the machine learning model based on the results of the evaluation of the normal data and/or the classification data. For example, the normal data may include an image of a dog. The machine learning model can create classification data from the image of the dog that indicates that there is a 90% probability that the image is of a dog. The data processor can determine characteristics such as the distance between clusters of different training data points (e.g., between a cluster of dog images, a cluster of cat images, and a cluster of bird images), an estimate of the boundary function, or a plurality of labels assigned to the normal data. The plurality of labels can be associated with a plurality of classifications. For example, the data processor can determine that the image of the dog was classified as 90% probability that the image is of a dog. Based on the classifications, the data processor can determine an estimate of an equation of the boundary function between images of dogs and images of cats, or any other suitable classifications. In some embodiments, the data processor can evaluate the classification data, created by the malicious computer, in order to learn enough information about the machine learning model in order to generate transition data that can be used to induce model shift in the machine learning model. After determining characteristics of the machine learning model, the data processor can return to step S614 in FIG. 6A and determine whether or not to continue inducing model shift, in the malicious computer's machine learning model.

After determining to continue inducing model shift at step S614, the data processor can determine to generate transition data at step S616. The data processor can determine to generate the transition data based on previously determined characteristics of the machine learning model, such as the estimate of the equation of the boundary function between, described above. In some embodiments, the data processor can determine a shifted boundary function used in the machine learning model of the malicious computer. The shifted boundary function may have been previously shifted due to previously provided transition data. The data processor can then proceed to step S624.

At step S624, the data processor can generate additional transition data. The additional transition data can be intended to induce model shift in the machine learning model. For example, the additional transition data can cause an image of a dog that may contain characteristics that may induce the machine learning model to classify the image of the dog close to the boundary function. At step S626, the data processor can provide the additional transition data to the malicious computer. The malicious computer can evaluate the additional transition data including the image of the dog. The machine learning model can classify the image of the dog as a "dog," but the classification can be near the boundary function. The malicious computer, can determine a new boundary function based on the additional transition data and the classification data. The boundary function may be shifted compared to the previous boundary function due to the additional transition data including data items classified near the previous boundary function. The additional transition data can cause a previously shifted boundary function to shift. Model shift has been induced in the malicious computer's machine learning model, by the data processor. In some embodiments, the boundary function can shift, causing a plurality of classifications to shift.

After providing the additional transition data to the malicious computer, the data processor can proceed to step S614 in FIG. 6A to determine to continue inducing model shift in the malicious computer's machine learning model. Each time that the data processor generates and provides transition data, the transition data can include data items that are closer to the machine learning model's boundary function, as shown in FIG. 1. In some embodiments, the data processor can continue generating and providing transition data over any suitable length of time. For example, the data processor can generate and provide transition data repeatedly to the malicious computer once a day for 2 weeks, every 30 minutes, every other week for 1 year, continuously, or the like.

Embodiments of the invention have a number of advantages. For example, embodiments allow a data processor to induce model shift in a machine learning model of a malicious computer, thus causing the malicious machine learning model to incorrectly perform classification and diminishing the malicious computer's ability to perform malicious actions.

Another advantage is that, according to embodiments of the invention, the data processor can diminish the malicious computer's ability to perform malicious actions over a longer timespan than previous method and systems. For example, in previous systems and methods, the data processor could simply blacklist the malicious computer after malicious activity is detected. However, it is easy for malicious computers to get around a blacklist, for example, the malicious computer can use a VPN, or the like, to essentially have a different IP address, thus allowing the malicious computer to contact the data processor. Embodiments of the invention allow for the data processor to diminish the malicious computer's ability to perform malicious actions, rather than simply making the malicious computer change its IP address.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   a) determining, by a data processor in a non-malicious computer, that a malicious computer is in communication with the data processor and uses a machine learning model with a boundary function for classification of input data in order to determine outcomes, and in response to determining that the malicious computer is in communication with the data processor, storing an IP address for the malicious computer in a blacklist file on the non-malicious computer, the non-malicious computer also having a whitelist file of approved IP addresses;
   b) generating, by the data processor, normal data, wherein the normal data includes typical input data that is input into a type of machine learning model so that the type of machine learning model can classify the input data;
   c) providing, by the data processor over a communications network, the normal data to the malicious computer;
   d) obtaining, by the data processor, classification data from the malicious computer, wherein the malicious computer uses the machine learning model to generate the classification data after the normal data is input into the machine learning model;
   e) determining, by the data processor, based on the classification data, characteristics of the machine learning model of the malicious computer, the characteristics including separations between clusters of different training data points and an estimate of the boundary function;
   f) generating, by the data processor, based on the characteristics of the machine learning model of the malicious computer, transition data to be used as an input to the machine learning model and intended to shift the boundary function;
   g) providing, by the data processor to the malicious computer over the communications network, the transition data;
   and
   h) repeating, by the data processor, steps f) and g), causing the boundary function in the machine learning model in the malicious computer to shift over time, wherein the data processor does not provide the transition data to computers at the approved IP addresses.

2. The method of claim 1, wherein the characteristics of the machine learning model include a plurality of labels assigned to the normal data.

3. The method of claim 2, wherein the machine learning model is a support vector machine, wherein the boundary function is a hyperplane, and wherein the hyperplane separates a plurality of classifications.

4. The method of claim 3, wherein the plurality of labels are associated with the plurality of classifications.

5. The method of claim 4, wherein the boundary function shifts causing the plurality of classifications to shift.

6. The method of claim 1, wherein generating the normal data further comprises:
retrieving, by the data processor, the normal data from a data source; and
classifying, by the data processor, the normal data.

7. The method of claim 1, wherein the transition data includes data items that share characteristics of data belonging to more than one classification.

8. The method of claim 1, wherein providing the transition data to the malicious computer comprises:
providing, by the data processor, the transition data to a data source, wherein the malicious computer retrieves the transition data from the data source.

9. The method of claim 1, wherein the machine learning model includes one or more of linear regression, logistic regression, decision trees, support vector machines, naive Bayes, kNN, K-means, or random forests.

10. The method of claim 1, wherein the transition data comprises images.

11. The method of claim 1, wherein the data processor determines that the malicious computer is in communication with the non-malicious computer by determining that the malicious computer is interacting with the non-malicious computer a high number of times at an unusual time of day.

12. A data processor comprising:
a processor,
a memory device; and
a computer-readable medium coupled to the processor, the computer-readable medium comprising code executable by the processor for implementing a method comprising:
a) determining in a non-malicious computer, that a malicious computer in communication with the data processor uses a machine learning model with a boundary function for classification of input data in order to determine outcomes, and in response to determining that the malicious computer is in communication with the data processor, storing an IP address for the malicious computer in a blacklist file on the non-malicious computer, the non-malicious computer also having a whitelist file of approved IP addresses;
b) generating normal data, wherein the normal data includes typical input data that is input into a type of machine learning model so that the type of machine learning model can classify the input data;
c) providing the normal data to the malicious computer over a communications network;
d) obtaining classification data from the malicious computer, wherein the malicious computer uses the machine learning model to generate the classification data after the normal data so that the type of machine learning model can classify the input data;
e) determining, by the data processor, based on the classification data, characteristics of the machine learning model of the malicious computer, the characteristics including separations between clusters of different training data points and an estimate of the boundary function;
f) generating, based on the characteristics of the machine learning model of the malicious computer, transition data, to be used as an input to the machine learning model and intended to shift the boundary function;
g) providing, to the malicious computer over the communications network, the transition data; and
h) repeating steps f) and g), causing the boundary function in the machine learning model in the malicious computer to shift over time, wherein the data processor does not provide the transition data to computers at the approved IP addresses.

13. The data processor of claim 12, wherein the characteristics of the machine learning model include a plurality of labels assigned to the normal data.

14. The data processor of claim 13, wherein the machine learning model is a support vector machine, wherein the boundary function is a hyperplane, and wherein the hyperplane separates a plurality of classifications.

15. The data processor of claim 14, wherein the plurality of labels are associated with the plurality of classifications.

16. The data processor of claim 15, wherein the boundary function shifts causing the plurality of classifications to shift.

17. The data processor of claim 12, wherein generating the normal data further comprises:
retrieving the normal data from a data source; and
classifying the normal data.

18. The data processor of claim 12, wherein the transition data includes data items that share characteristics of data belonging to more than one classification.

19. The data processor of claim 12, wherein providing the transition data to the malicious computer comprises:
providing the transition data to a data source, wherein the malicious computer retrieves the transition data from the data source.

20. The data processor of claim 12, wherein the machine learning model includes one or more of linear regression, logistic regression, decision trees, support vector machines, naive Bayes, kNN, K-means, or random forests.

* * * * *